United States Patent
LeFevre et al.

(10) Patent No.: US 9,481,164 B2
(45) Date of Patent: *Nov. 1, 2016

(54) RELEASE AGENT COMPOSITION FOR TANDEM SOLID INKJET IMAGING SYSTEMS HAVING IMPROVED WETTABILITY

(71) Applicant: Xerox Corporation, Norwalk, CT (US)

(72) Inventors: Jason M. LeFevre, Penfield, NY (US); Paul J. McConville, Webster, NY (US); James M. Chappell, Webster, NY (US); Joanne L. Lee, Rochester, NY (US); Rachael L. McGrath, Churchville, NY (US); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/260,798

(22) Filed: Apr. 24, 2014

(65) Prior Publication Data

US 2015/0307727 A1   Oct. 29, 2015

(51) Int. Cl.

| | |
|---|---|
| C10M 105/76 | (2006.01) |
| B41J 2/01 | (2006.01) |
| C10M 107/50 | (2006.01) |
| B41J 2/175 | (2006.01) |
| B41M 5/025 | (2006.01) |
| C08L 83/00 | (2006.01) |
| C09D 183/08 | (2006.01) |

(52) U.S. Cl.
CPC ............... *B41J 2/01* (2013.01); *B41J 2/17593* (2013.01); *B41M 5/0256* (2013.01); *C10M 105/76* (2013.01); *C10M 107/50* (2013.01); *B41J 2002/012* (2013.01); *C08L 83/00* (2013.01); *C09D 183/08* (2013.01)

(58) Field of Classification Search
CPC .. C09D 183/00; C08L 83/00; C10M 105/76; C10M 107/50
See application file for complete search history.

(56) References Cited

U.S. PATENT DOCUMENTS

| | | | |
|---|---|---|---|
| 6,183,929 B1 * | 2/2001 | Chow | C09D 183/08 399/333 |
| 9,127,230 B2 * | 9/2015 | LeFevre | C10M 105/76 |
| 2014/0204150 A1 * | 7/2014 | LeFevre et al. | 347/21 |

* cited by examiner

*Primary Examiner* — Gregory Listvoyb
(74) *Attorney, Agent, or Firm* — Maginot Moore & Beck LLP

(57) ABSTRACT

Functional amine release agents displaying improved wetting as compared to standard silicone oils comprise a polydimethylsiloxane oil and a functional amine selected from the group consisting of pendant propylamines and pendant N-(2-aminoethyl)-3-aminopropyl, in which the concentration of functional amine to polydimethylsiloxane oil is approximately less than 0.0006 meq/g and the release agents have a viscosity of 20 cSt and 10 cSt. In an in-line tandem print system, the 20 cSt release agent is used in the upstream print engine while the 10 cSt release agent is used in the downstream print engine.

3 Claims, 2 Drawing Sheets

RELEASE AGENT COMPOSITION FOR TANDEM SOLID INKJET IMAGING SYSTEMS HAVING IMPROVED WETTABILITY

BACKGROUND

Solid inkjet imaging systems generally use an electronic form of an image to distribute ink melted from a solid ink stick or pellet in a manner that reproduces the electronic image. In some solid inkjet imaging systems, the electronic image may be used to control the ejection of ink directly onto a media sheet. In other solid inkjet imaging systems, the electronic image is used to operate printheads to eject ink onto an intermediate imaging member. A media sheet is then brought into contact with the intermediate imaging member in a nip formed between the intermediate member and a transfer roller. The heat and pressure in the nip help transfer the ink image from the intermediate imaging member to the media sheet, which is transported from the system and deposited in a paper tray.

In solid ink imaging systems having intermediate imaging members, ink is loaded into the system in a solid form, either as pellets or as ink sticks, and transported through a feed chute by a feed mechanism for delivery to a melting device. The melting device heats the solid ink to its melting temperature and the liquid ink is delivered to a printhead for jetting onto an intermediate imaging member. In the print head, the liquid ink is typically maintained at a temperature that enables the ink to be ejected by the printing elements in the print head, but that preserves sufficient tackiness for the ink to adhere to the intermediate imaging member. In some cases, however, the tackiness of the liquid ink may cause a portion of the ink to remain on the intermediate imaging member after the image is transferred onto the media sheet and the residual ink may later degrade other ink images formed on the intermediate imaging member.

In continuous-web, direct-to-media printing, a fixing assembly is used after the ink is ejected onto the print media or web to fix the ink to the web. The fixing assembly used depends on the type of ink. For example, when using melted phase change ink to form images, the fixing assembly may include a pair of rollers or drums that define a nip for applying pressure to the ink and web to spread the ink on the web as the web passes through the nip, as depicted in FIG. 1. The function of the pair of rollers, also referred to herein as a spreader, is to transform a pattern of ink drops deposited onto a web by flattening and spreading the ink drops to make a more uniform and continuous layer. The spreader uses pressure and heat to reduce the height of the ink droplets and fill the spaces between adjacent drops.

One difficulty faced in the operation of the spreader is providing the web and the ink deposited on the web to the spreader at a temperature that enables the ink deposited on the web to be spread uniformly for high image quality. Due to very fast processing speeds at which some continuous feed imaging devices operate, the ink deposited on the web at the print station may be above a suitable temperature range as the image passes through the nip. This high ink temperature results in the ink bleeding into the web and possibly showing through to the opposite side of the media web. Conversely, if the ink cools below the suitable temperature range prior to reaching the spreader, the ink may not be malleable enough to allow for sufficient line spread or adherence to the web. In addition, the ink ejected by the printheads is generally much hotter than the print medium, and, consequently, areas imaged with high ink coverage may exit from the print zone at higher temperatures than the areas of the media web where little or no ink was ejected Ink that enters the spreader at varying temperatures can cause inconsistent and non-uniform line spread on the web, reducing image quality. Thus, improved media and ink temperature equalization is desirable. For optimum spreader performance, ink and web temperatures are substantially equalized prior to entering the nip to within a target temperature range that promotes adherence of the melted ink to the web, minimizes visibility of printed ink from the opposite side of the media ("show-through"), maximizes ink dot spread, and reduces image defects on the opposite side of the media in a duplex printing process. The target temperature range for the ink and web prior to entering the nip can also be referred to as the pre-spreading temperature range. In one embodiment, the pre-spreading temperature range is between about 50° C. and about 55° C. The pre-spreading temperature range, however, can be any suitable range of temperatures suitable for spreading ink on a web depending on factors such as the ink formulation, web substrate material, web velocity, and the like.

To address and/or prevent the accumulation of ink on an intermediate imaging member or on a spreader, which may be in the form of a drum, solid ink imaging systems may be provided with a drum maintenance unit (DMU), as shown in FIG. 1, that releases an oil or oil blend that lubricates the image receiving surface of the intermediate imaging member before each print cycle, thereby preventing ink offset to the spreader drum. Typically, these DMU oils are silicone oils that may contain additives to allow for proper lubrication and release characteristics.

Some print machines are capable of duplex printing, namely printing on both sides of the print media or web. Other print machines utilize separate similarly configured print engines, such as the upstream and downstream in-line print engines depicted in the diagram of FIG. 2. Tandem duplex print lines such as the system depicted in FIG. 2 provide high speed duplex printing using a fixing assembly such as the fixing assembly depicted in FIG. 1. Consequently, the upstream and downstream print engines each have their own DMU for transferring the release oil formulation to the spreader drum. As mentioned, oiling the spreader drum is necessary to prevent ink offset to the spreader drum and to other duplex sensitive components during duplex printing.

However, in some printing processes, the print media is subject to further processing downstream of the printing machine. For instance, a "post-printing" coating, such as a varnish, may be applied to the printed media or web to enable acceptable print durability. In some processes, the post-printing coating is necessary to avoid damage to the image in subsequent finishing or converting equipment, such as might be used in a direct-mail process for instance. The typical DMU formulation tends to remain on the surface of the print media, rather than soaking in, which interferes with the ability of the coating solution (e.g., varnish) to properly "wet" the surface of the printed material, particularly when the coating solution is applied during a high-speed in-line process. This interference thus results in poor coating uniformity and effectiveness of the "post-printing" coating.

As such, a DMU oil formulation for use in solid ink jet color web-press printers that provides sufficient lubrication to an image receiving surface of the intermediate imaging member and image fixing members (i.e. a spreader drum)

without interfering with downstream production finishing or converting equipment would be appreciated in the art.

SUMMARY

Figure 1:
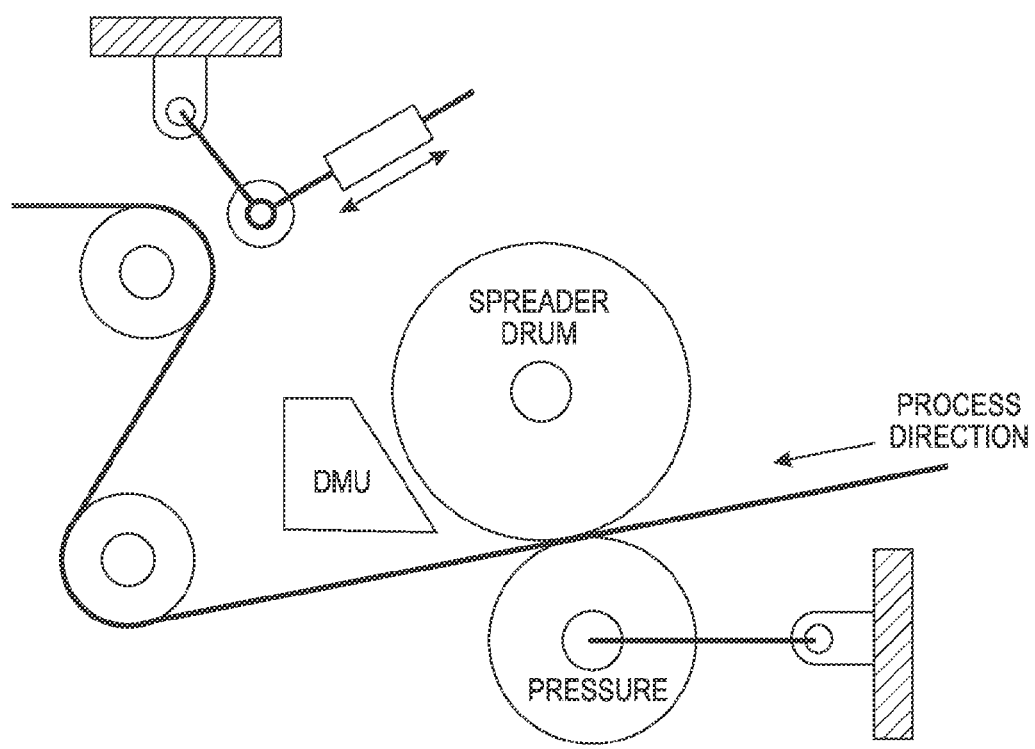
FIG. 1 is a diagram of a fixing assembly in a print machine.
Figure 2:
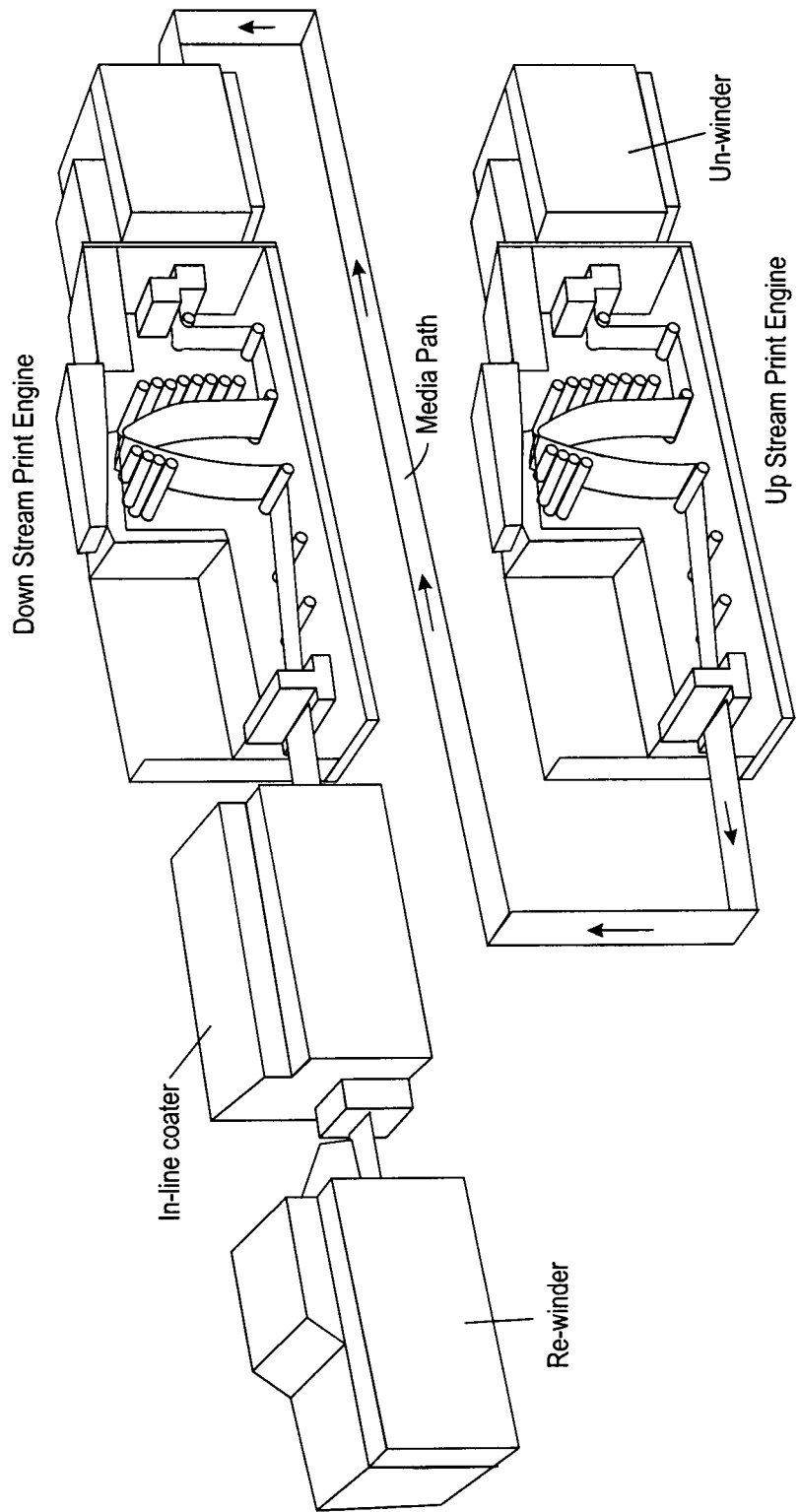
FIG. 2 is a diagram of an in-line tandem duplex printing system.

According to certain embodiments, the present application relates to a functional amine release agent comprising: a polydimethylsiloxane oil and a functional amine selected from the group consisting of pendant propylamines and pendant N-(2-aminoethyl)-3-aminopropyl whereby the ratio of functional amine to polydimethylsiloxane oil is approximately 0.0006 meq/g. In one aspect, the release agent has a viscosity of about 20 cSt. In a further aspect, the release agent has a viscosity of about 10 cSt.

According to at least one embodiment, the present application relates to method for printing an image in an in-line duplex printing system having an upstream print engine and a downstream print engine, each print engine having an image fixing assembly for fixing an ink image to a print media, the fixing assembly including a drum maintenance unit (DMU). The method includes operating the DMU to apply to a component of the image fixing assembly of each print engine a functional amine release agent comprising a polydimethylsiloxane oil and a functional amine selected from the group consisting of pendant propylamines and pendant N-(2-aminoethyl)-3-aminopropyl. In a subsequent step, an image is printed the print media in the upstream print engine, and then another image is printed on the print media in the downstream print engine.

In one aspect of the disclosure, the concentration of functional amine to polydimethylsiloxane oil is approximately 0.0006 meq/g in the release agent applied by the DMU in both print engines. However, in a further aspect, the release agent applied by the DMU in the upstream print engine has a viscosity that is greater than the viscosity of the release agent applied by the downstream DMU. In one particular aspect, the release agent for the upstream print engine has a viscosity of about 20 cSt, and the release agent for the downstream print engine has a viscosity of about 10 cSt.

DETAILED DESCRIPTION

For the purposes of promoting an understanding of the principles of the invention, reference will now be made to the embodiments described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

According to certain embodiments of the present application, a release agent composition for solid inkjet imaging systems is disclosed. As discussed above, release agent compositions for solid inkjet imaging systems are typically administered by an intermediate imaging member via a delivery mechanism such as a drum maintenance unit ("DMU") delivery roll that may be at least partially immersed in a sump containing one or more release agent compositions. In certain embodiments, a release agent composition of the present application is provided to the intermediate imaging member in an amount of from about 1 mg per sheet of blank A4 sized paper to about 4 mg per sheet of blank A4 paper, and about 4 mg per sheet of blank A4 paper to about 10 mg per sheet of A4 paper for 100% solid-fill. The system by which a release agent composition is provided to an intermediate imaging member is well known, and may be accomplished in a continuous or semi-continuous manner.

According to certain exemplary embodiments, a release agent comprises an amino functionalized polydimethylsiloxane release agent created by utilizing an amine-containing polydimethylsiloxane concentrate and subsequently diluting with nonfunctional polyorganosiloxane oil to provide a release agent with a relatively consistent distribution of amines in a large volume of polydimethylsiloxane oil. In producing the amine-containing polydimethylsiloxane concentrate, an end blocker, amino siloxane, catalyst and octamethyltetracyclosiloxane are reacted in a vessel at elevated temperature (of from about 100 to about 210.degree. C., or from about 145 to about 185.degree. C.), for a desired time (of from about 2 to about 15 hours, or from about 5 to about 10 hours). The resulting reaction product is then diluted with non-functional polydimethylsiloxane for use as a release agent composition for solid inkjet imaging. The amount and concentration of the non-functional polydimethylsiloxane may be adjusted depending upon the initial coefficient of friction of the print media. It will be appreciated that blending may be performed according to blending techniques provided by Wacker Silicones Corp. of Adrian Mich. According to other certain embodiments, the amount and concentration of the non-functional polydimethylsiloxane may be adjusted depending upon the initial coefficient of friction of the print media so that the composition does not reduce the coefficient of friction to the paper or media being printed upon by the solid inkjet printer by more than about 0.1.

According to certain exemplary embodiments, suitable amino-functional release agents include pendant propylamines and pendant N-(2-aminoethyl)-3-aminopropyl functional groups. For example, according to certain embodiments, a pendant propylamine release agent include those having the following structure:

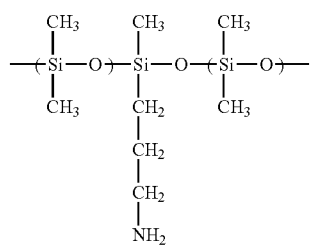

Further, according to certain embodiments, a pendant N-(2-aminoethyl)-3-aminopropyl release agent include those having the following structure:

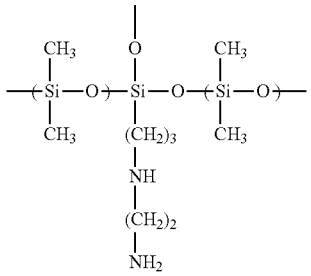

Alternatively, a blend of two amino-functional release agent materials can be used as the release agent composition. For example, a blend of two or more of the above-described amino-functional release agents can be used. In certain embodiments, the blend comprises two different release agent materials of the above structures. In other embodiments, a blend of two or more different amino-functional release agents having the above amine concentrations can be used.

According to certain alternative embodiments, amine stabilizers are utilized, such as hindered amine light stabilizers including 2,2,6,6-tetramethyl piperidine and its derivatives.

Examples

According to one exemplary embodiment, a pendant N-(2-aminoethyl)-3-aminopropyl release agent was created according to the above system by adding an amine-containing polydimethylsiloxane concentrate and subsequently diluting with polydimethylsiloxane to a concentration of approximately 0.0006 meq/g and a viscosity of about 20 cSt. Thereafter, the pendant N-(2-aminoethyl)-3-aminopropyl release agent was administered to a solid ink jet color web-press printer, and the printer was used to process print jobs as compared to a standard silicone oil. In this instance, the standard silicone oil used was Copy-Aid 270; 72 cSt, 0.01 meq/g functional amine (available from Wacker Silicones; Adrian, Mich., USA) with a viscosity in the range of 50-70 cSt.

In further examples, the lower viscosity DMU oil was prepared in a process starting with Copy Aid 200 (amino concentrate) having a viscosity of 613 cSt and an amine content of 0.75 mol %. The Copy Aid concentrate was added drop-wise to a stirring diluent, namely polydimethylsiloxane (PDMS) with a viscosity of 20 cSt. The concentrate was added at 0.48% and the PDMS at 99.52% to yield the 20 cSt DMU oil disclosed herein. This release agent is used in the upstream print engine of an in-line tandem duplex print system.

In a further example, a lower viscosity release agent is used in the downstream print engine of the in-line tandem duplex print system. This release agent has a viscosity of about 10 cSt. This lower viscosity release agent was prepared according to the same process described above for the 20 cSt release agent, except that a different concentrate was used to dilute the Copy Aid concentrate. In particular, a PDMS having a viscosity of 10 cSt was used as the diluents.

In a further aspect, the reduced viscosity of the release agent for the downstream print engine disclosed herein allowed the release agent to "soak in" to the media, thereby allowing the coating to wet the media and provide a continuous layer of release agent. Testing substantiated that the higher viscosity standard silicone oil (50 cSt) required a significantly greater amount of time to spread on a test media than the release agent having a viscosity of 20 cSt disclosed herein. In particular, the standard oil required about an hour to achieve the coverage achieved by the release agent disclosed herein at time T=0 after application of the agent. Similarly, the standard oil required about 2 hours to achieve the coverage reached by the present release agent at time T=5 after application. Rapid coating times are essential for many in-line coating processes having high through-put.

The low viscosity of the two release agents disclosed herein provides improved wetability over the prior silicone oils used in DMUs. The lower viscosity also allows the release agent coating to be as thin as possible for lower "coat weights", which leads to a reduction in coating costs. The DMU disclosed herein has no adverse effects on printing in either simplex or on duplex mode, and does not require any change in simplex spreader roll offset or duplex pressure roll offset. Moreover, the DMU disclosed herein does not require any change in process temperatures from the conventional silicon oils, which is desirable to preserve image permanence and image quality. Moreover, the relatively lower functional amine ratio (0.0006 meq/g) produces a suitable coefficient of friction on the coated substrate to accommodate high through-put printing operations.

The present disclosure contemplates improved functional silicone DMU formulations having significantly lower viscosity than conventional DMU oils. Moreover, the present disclosure contemplates using different viscosity formulations between upstream and downstream print engines in an in-line tandem duplex print system. In particular, a 0.0006 meq/g functional amine release agent having a viscosity of 20 cSt is applied to the image fixing component of the upstream print engine. The upstream print engine is essentially operating in a duplex mode so that after the image is fixed to a surface of the print media in the upstream print engine, the media is conveyed to the downstream print engine. The 20 cSt release agent applied in the upstream print engine does not adversely affect the print function at the downstream print engine.

In the downstream print engine, a 0.0006 meq/g functional amine release agent having a viscosity of 10 cSt is applied to the downstream image fixing component. The downstream print engine is essentially operating in a simplex mode so an even lower viscosity release agent can be utilized without concern over image fixing. After the image is applied to the print media in the downstream print engine, the media passes to a downstream component, such as an in-line coater that applies a coating to the print media. The 10 cSt release agent applied in the downstream print engine does not adversely affect the "post printing" coating or otherwise compromise the function of that coating.

While the invention has been described in detail with reference to specific and preferred embodiments, it will be appreciated that various modifications and variations will be apparent to one of ordinary skill in the art. All such modifications and embodiments as may readily occur to one skilled in the art are intended to be within the scope of the appended claims.

What is claimed is:

1. A functional amine release agent comprising:
a polydimethylsiloxane oil; and
a functional amine selected from the group consisting of pendant propylamines and pendant N-(2-aminoethyl)-3-aminopropyl;
whereby the concentration of functional amine to polydimethylsiloxane oil is 0.0006 meq/g and the release agent has a viscosity of 10 cSt.

2. The functional amine release agent of claim 1, wherein the print media is paper.

3. The functional amine release agent of claim 2, wherein the functional amine release agent is operable to reduce the coefficient of friction of print media when placed in contact with said media by no more than 0.1.

* * * * *